United States Patent
Rose et al.

(10) Patent No.: US 12,135,821 B2
(45) Date of Patent: *Nov. 5, 2024

(54) SMART DE-IDENTIFICATION USING DATE JITTERING

(71) Applicant: PRIVACY ANALYTICS INC., Ottawa (CA)

(72) Inventors: Sean Rose, Ottawa (CA); Weilong Song, Ottawa (CA); Martin Scaiano, Ottawa (CA)

(73) Assignee: PRIVACY ANALYTICS INC. (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/460,526

(22) Filed: Sep. 1, 2023

(65) Prior Publication Data
US 2023/0409750 A1    Dec. 21, 2023

Related U.S. Application Data

(63) Continuation of application No. 17/730,592, filed on Apr. 27, 2022, now Pat. No. 11,748,517, which is a continuation of application No. 16/802,045, filed on Feb. 26, 2020, now Pat. No. 11,334,685, which is a continuation of application No. 16/398,771, filed on Apr. 30, 2019, now Pat. No. 10,586,074, which is a continuation of application No. 15/385,710, filed on Dec. 20, 2016, now Pat. No. 10,318,763.

(51) Int. Cl.
*G06F 21/62*    (2013.01)

(52) U.S. Cl.
CPC ............................ *G06F 21/6254* (2013.01)

(58) Field of Classification Search
CPC . H04L 63/20; H04L 63/0272; H04L 12/4641; H04L 63/0884; H04L 63/0823; H04L 41/0806; H04L 63/0876; H04L 63/126; G06F 9/441; G06F 9/4411; G06F 9/4406
See application file for complete search history.

(56) References Cited

U.S. PATENT DOCUMENTS

| | | |
|---|---|---|
| 7,707,413 B2 | 4/2010 | Lunt |
| 8,495,065 B2 | 7/2013 | Petersen |

(Continued)

*Primary Examiner* — Hosuk Song
(74) *Attorney, Agent, or Firm* — John Maldjian; Stevens & Lee PC

(57) ABSTRACT

System and method to produce an anonymized cohort having less than a predetermined risk of re-identification. The method includes receiving a data query of requested traits for the anonymized cohort, querying a data source to find records that possess at least some of the traits, forming a dataset from at least some of the records, and grouping the dataset in time into a first boundary group, a second boundary group, and one or more non-boundary groups temporally between the first boundary group and second boundary group. For each non-boundary group, calculating maximum time limits the non-boundary group can be time-shifted without overlapping an adjacent group, calculating a group jitter amount, capping the group jitter amount by the maximum time limits and by respective predetermined jitter limits, and jittering said non-boundary group by the capped group jitter amount to produce an anonymized dataset. Return the anonymized dataset.

20 Claims, 5 Drawing Sheets

(56) References Cited

U.S. PATENT DOCUMENTS

| | | |
|---|---|---|
| 8,590,049 B2 | 11/2013 | Cormode |
| 8,626,749 B1 | 1/2014 | Trepetin |
| 8,627,483 B2 | 1/2014 | Rachlin |
| 8,627,488 B2 | 1/2014 | Cormode |
| 8,739,271 B2 | 5/2014 | Schultz |
| 8,972,187 B1 | 3/2015 | Steinmetz |
| 9,076,010 B2 * | 7/2015 | Toyoda ............... G06F 21/6254 |
| 9,098,723 B2 | 8/2015 | Petersen |
| 9,195,852 B2 | 11/2015 | Dimitrakos |
| 9,397,890 B2 * | 7/2016 | Petersen ............. H04L 41/0893 |
| 9,595,051 B2 * | 3/2017 | Stack ..................... G06Q 10/10 |
| 9,953,176 B2 | 4/2018 | Koo |
| 10,025,939 B2 | 7/2018 | Kenthapadi |
| 10,318,763 B2 | 6/2019 | Rose |
| 10,360,372 B1 | 7/2019 | Kenthapadi et al. |
| 10,366,249 B2 | 7/2019 | Chen et al. |
| 10,572,673 B2 * | 2/2020 | Nishitani ................ G06F 1/187 |
| 10,586,074 B2 | 3/2020 | Rose |
| 10,657,286 B2 | 5/2020 | Nambiar |
| 10,762,237 B2 | 9/2020 | Ukena-Bonfig et al. |
| 10,936,744 B1 | 3/2021 | Trepetin |
| 10,938,664 B2 | 3/2021 | Kumaran et al. |
| 11,334,685 B2 | 5/2022 | Rose |
| 11,748,517 B2 * | 9/2023 | Rose ................... G06F 21/6254 726/26 |

\* cited by examiner

300

350

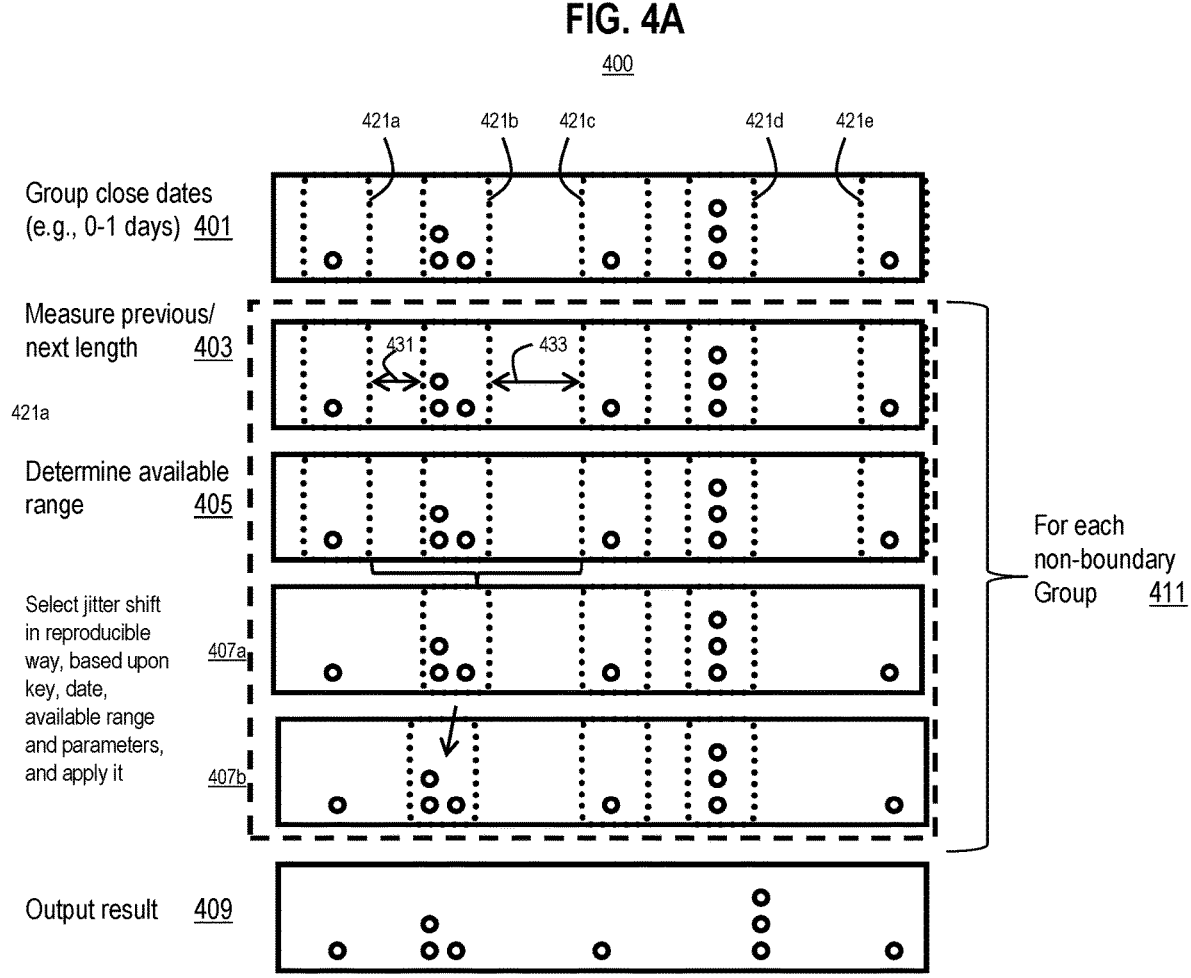

450

SMART DE-IDENTIFICATION USING DATE JITTERING

CROSS-REFERENCE TO RELATED APPLICATIONS

This application is a continuation of U.S. patent application Ser. No. 17/730,592, filed on Apr. 27, 2022, now U.S. Pat. No. 11,748,517, which is a continuation of U.S. patent application Ser. No. 16/802,045, filed on Feb. 26, 2020, now U.S. Pat. No. 11,334,685 which is a continuation of U.S. patent application Ser. No. 16/398,771, filed on Apr. 30, 2019, now U.S. Pat. No. 10,586,074, which is a continuation of U.S. patent application Ser. No. 15/385,710, filed on Dec. 20, 2016, now U.S. Pat. No. 10,318,763 the entire contents of which are hereby incorporated by reference in their entirety.

BACKGROUND

Field

The present disclosure relates to risk assessment of datasets and in particular to reducing re-identification risk of a dataset.

Description of Related Art

Personal information is continuously captured in a multitude of electronic databases. Details about health, financial status and buying habits are stored in databases managed by public and private sector organizations. These databases contain information about millions of people, which can provide valuable research, epidemiologic and business insight. For example, examining a drugstore chain's prescriptions can indicate where a flu outbreak is occurring. To extract or maximize the value contained in these databases, data custodians often must provide outside organizations access to their data. In order to protect the privacy of the people whose data is being analyzed, a data custodian will "de-identify" or "anonymize" information before releasing it to a third-party. An important type of de-identification ensures that data cannot be traced to the person about whom it pertains, this protects against "identity disclosure".

When de-identifying records, removing just direct identifiers such as names and addresses is not sufficient to protect the privacy of the persons whose data is being released. The problem of de-identification involves personal details that are not obviously identifying. These personal details, known as quasi-identifiers, include the person's age, sex, postal code, profession, ethnic origin and income, financial transactions, medical procedures, adjusting dates of events, and so forth. De-identification of data requires an assessment of the risk of re-identification.

Dates, whether they represent dates of birth, visit dates, treatment dates or a date associated with another type of event, also can be used to identify an individual. In addition to the dates themselves, the interval of time between pairs of dates also can be used to identify an individual. Thus, including either the exact dates or even dates with a simple shift having been applied (i.e., two or more dates that are moved together by an identical amount and direction), increases a risk that individuals in the dataset may be re-identified.

Once the risk is determined, the risk may be reduced if necessary by perturbing the data. Perturbation is a risk mitigation technique that changes a field value in a dataset in order to lower risk. For example, suppose a re-identification risk of a database is measured. If the measured risk needs to be lowered, perturbing the data may modify a field in the database by replacing actual data in the field with a value different but similar to an original value of the data in the field. However, if perturbation is not done intelligently, the perturbation may introduce problems in a returned dataset.

Previous methods to anonymize dates suffered one or more of the following problems: First, such methods were prone to interval attacks, i.e., if the interval of time between a pair of dates remained unchanged such as by application of a simple shift, this provided to an attacker an opportunity to re-identify individuals.

Second, such methods suffered from a loss of analytic value, e.g., interval information would be completely lost due to over-generalization, by grouping dates into large buckets. For example, clients may want to analyze exact dates. Methods of the background art may over-generalize patient data just to the year, e.g., events occurring on Jan. 1, 2015 and Dec. 31, 2015 would be over-generalized to be listed only as occurring in 2015. Over-generalized data makes it impossible to perform some important analysis like, was the patient readmitted within three days, or 30 days of going to a hospital.

Third, such methods did not allow for incremental order integrity. For example, sets of successive dates might have been shifted, and although they might have maintained their order internally, they might lose their external order. For example, if one pair of dates (A1, A2) and a second pair of events (B1, B2) had an external date order before anonymization of A1-A2-B1-B2, prior methods of the known art might anonymize the dates to have an external date order after anonymization of A1-B1-A2-B2.

Fourth, such methods suffered from date drift, e.g., very large sets of dates would have dates shifted far into the past or future in an unconstrained manner. For example, some data sets suffering from data drift would accordion in or out (e.g., get smaller or get bigger), depending upon how random numbers controlling the process were generated.

Accordingly, systems and methods that enable lowered risk of re-identification remains highly desirable.

BRIEF SUMMARY

Embodiments, when paired with a date shifting process, solves the problems of the background art noted above, to achieve a high level of analytic value as well as a justifiably low risk of re-identification.

Embodiments in accordance with the present disclosure provide other important features. For example, embodiments are repeatable, i.e., if given the same input and secret jitter key, embodiments will produce the same output. In contrast, methods of the background art would rely on simple random noise to adjust dates. Simple random noise by itself defeats a second important feature of incremental ordering integrity. Ordering integrity means that, if two or more successive batches or dates have the process applied to them, the batches or dates will maintain their ordering relative to each other. Ordering integrity also can be bound parametrically to ensure that adjusted dates do not suffer from a "date drift" problem.

Embodiments in accordance with the present disclosure may alter lengths of intervals between pairs of patient related dates, such that an attacker could not use known intervals as an attack vector to re-identify individuals in a dataset.

Embodiments in accordance with the present disclosure include a system and a method to produce an anonymized cohort, members of the cohort having less than a predetermined risk of re-identification. The system includes a communication interface to a database of medical data and a processor coupled to a memory and to the database, the memory storing instructions to be executed by the processor, the instructions causing the processor to perform the steps of receiving a data query via a user-facing communication channel to request an anonymized cohort, the data query comprising requested traits to include in members of the cohort, querying a data source, using a data query transmitted via a data source-facing communication channel, to find data records that possess at least some of the traits, forming a dataset from at least some of the data records, and grouping the data records in time into a first boundary group, a second boundary group, and one or more non-boundary groups temporally between the first boundary group and second boundary group. For each non-boundary group within the dataset, the processor performs the steps of calculating maximum positive and negative time limits said non-boundary group can be time-shifted without overlapping an adjacent group, calculating a group jitter amount, capping the group jitter amount by the maximum positive and negative time limits, and jittering the non-boundary group by the capped group jitter. The anonymized dataset then is provided to a user via a user-facing communication channel.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of the present disclosure will become apparent upon consideration of the following detailed description of embodiments thereof, especially when taken in conjunction with the accompanying drawings wherein like reference numerals in the various figures are utilized to designate like components, and wherein:

FIG. 4A shows a data set at intermediate processing points in accordance with an embodiment of the present disclosure.

Figure 1:
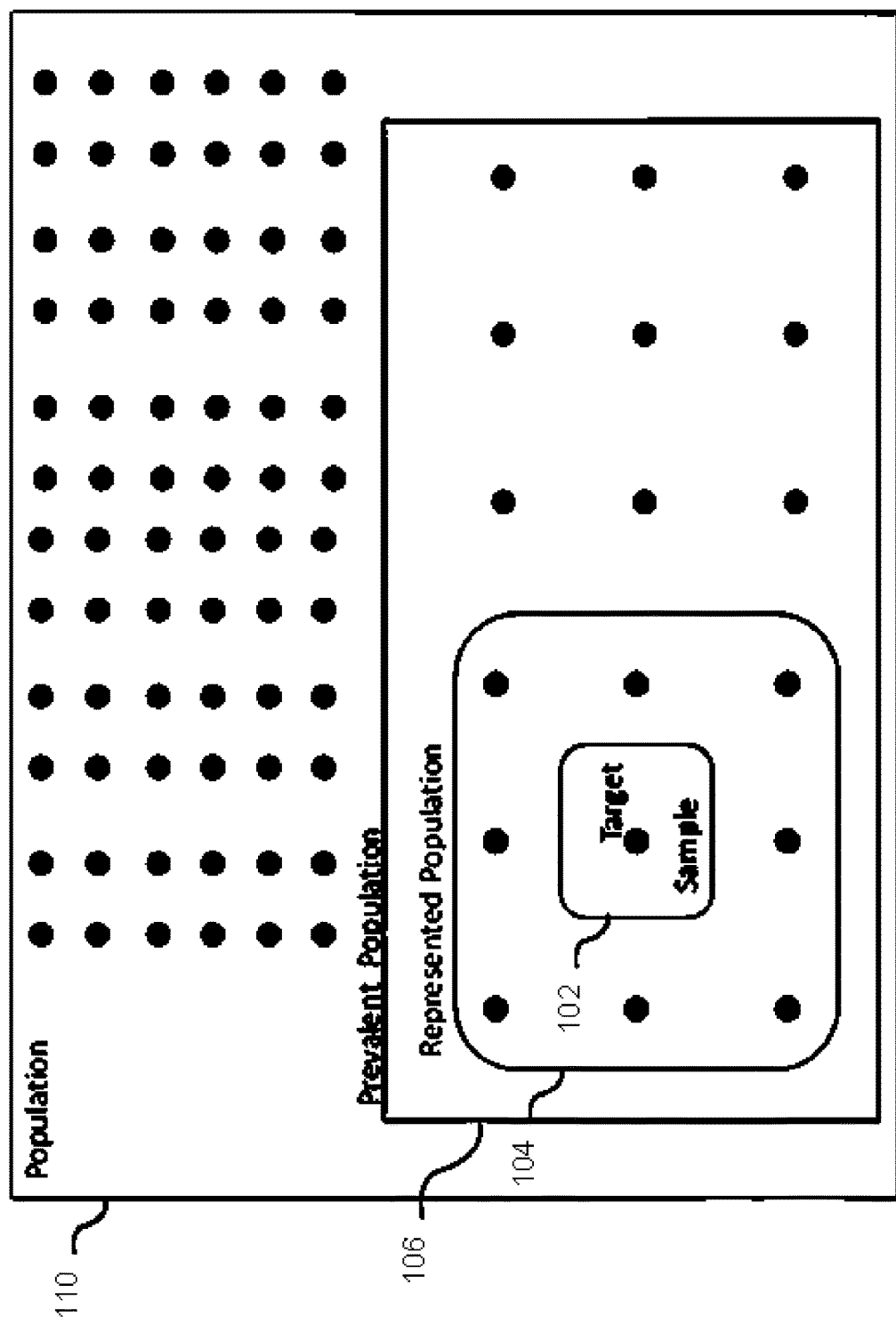
FIG. 1 shows a representation of a sample population in accordance with an embodiment of the present disclosure.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The disclosure will be illustrated below in conjunction with an exemplary computing and storage system. Although well suited for use with, e.g., a system using a server(s), data sources and/or database(s), the disclosure is not limited to use with any particular type of computing, communication and storage system or configuration of system elements. Those skilled in the art will recognize that the disclosed techniques may be used in any computing, communication and storage application in which it is desirable to store protected data, such as medical data, financial data, educational records data, etc.

As used herein, the term "module" refers generally to a logical sequence or association of steps, processes or components. For example, a software module may include a set of associated routines or subroutines within a computer program. Alternatively, a module may comprise a substantially self-contained hardware device. A module may also include a logical set of processes irrespective of any software or hardware implementation.

A module that performs a function also may be referred to as being configured to perform the function, e.g., a data module that receives data also may be described as being configured to receive data. Configuration to perform a function may include, for example: providing and executing sets of computer code in a processor that performs the function; providing provisionable configuration parameters that control, limit, enable or disable capabilities of the module (e.g., setting a flag, setting permissions, setting threshold levels used at decision points, etc.); providing or removing a physical connection, such as a jumper to select an option, or to enable/disable an option; attaching a physical communication link; enabling a wireless communication link; providing electrical circuitry that is designed to perform the function without use of a processor, such as by use of discrete components and/or non-CPU integrated circuits; setting a value of an adjustable component (e.g., a tunable resistance or capacitance, etc.), energizing a circuit that performs the function (e.g., providing power to a transceiver circuit in order to receive data); providing the module in a physical size that inherently performs the function (e.g., an RF antenna whose gain and operating frequency range is determined or constrained by the physical size of the RF antenna, etc.), and so forth.

As used herein, the term "transmitter" may generally include any device, circuit, or apparatus capable of transmitting a signal. As used herein, the term "receiver" may generally include any device, circuit, or apparatus capable of receiving a signal. As used herein, the term "transceiver" may generally include any device, circuit, or apparatus capable of transmitting and receiving a signal. As used herein, the term "signal" may include one or more of an electrical signal, a radio signal, an optical signal, an acoustic signal, and so forth.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium excludes a computer readable signal medium such as a propagating signal. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Embodiments are described below, by way of example only, with reference to FIGS. 1-4. The exemplary systems and methods of this disclosure will also be described in relation to software, modules, and associated hardware. However, to avoid unnecessarily obscuring the present disclosure, the following description omits well-known structures, components and devices that may be shown in block diagram form, are well known, or are otherwise summarized.

Certain sensitive personal information like patient health information is protected by law (e.g., Healthcare Information Portability and Accountability Act ("HIPAA," codified at 42 U.S.C. § 300 gg and 29 U.S.C § 1181 et seq. and 42 USC 1320d et seq.) in the U.S.) and must be treated in a way that maintains patient privacy. Such information is termed protected health information (PHI). With respect to PHI, it is important to avoid disclosing the PHI of a specific patient, or to disclose PHI so specific that it discloses an identity of a specific patient. All stakeholders involved must accept their stewardship role for protecting the PHI data contained within. It is essential that systems that access the PHI do so in full compliance with HIPAA and any other applicable laws or regulations of the country concerned, and in a secure manner.

Patient information, including PHI, is sometimes needed for medical studies. For example, observational studies are an important category of study designs. For some kinds of investigative questions (e.g., related to plastic surgery), randomized controlled trials may not always be indicated or ethical to conduct. Instead, observational studies may be the next best method to address these types of questions. Well-designed observational studies may provide results similar to randomized controlled trials, challenging the belief that observational studies are second-rate. Cohort studies and case-control studies are two primary types of observational studies that aid in evaluating associations between diseases and exposures.

Three types of observational studies include cohort studies, case-control studies, and cross-sectional studies. Case-control and cohort studies offer specific advantages by measuring disease occurrence and its association with an exposure by offering a temporal dimension (i.e. prospective or retrospective study design). Cross-sectional studies, also known as prevalence studies, examine the data on disease and exposure at one particular time point. Because the temporal relationship between disease occurrence and exposure cannot be established, cross-sectional studies cannot assess the cause and effect relationship.

Cohort studies may be prospective or retrospective. Retrospective cohort studies are well-suited for timely and inexpensive study design. Retrospective cohort studies, also known as historical cohort studies, are carried out at the present time and look to the past to examine medical events or outcomes. A cohort of subjects, selected based on exposure status, is chosen at the present time, and outcome data (i.e. disease status, event status), which was measured in the past, are reconstructed for analysis. An advantage of the retrospective study design analysis is the immediate access to the data. The study design is comparatively less costly and shorter than prospective cohort studies. However, disadvantages of retrospective study design include limited control the investigator has over data collection. The existing data may be incomplete, inaccurate, or inconsistently measured between subjects, for example, by not being uniformly recorded for all subjects.

Some medical studies, such as retrospective cohort studies, may involve authorized access by medical researchers to anonymized PHI, i.e., to PHI that ideally is not identifiable with the original patient. However, in practice there is nonzero risk that the anonymized data may be re-identified back to the original patient, for example, if data selection criteria is excessively narrow, thus risking that a very small pool of patients meet the selection criteria.

Databases or datasets generated therefrom that contain personally identifiable information such as those used in medical and financial information can include a cross-sectional data (L1) in addition to longitudinal data (L2). Cross-sectional data includes a single record for each subject. A dataset is longitudinal if it contains multiple records related to each subject and the number of records may vary subject to subject. For example, part of a longitudinal dataset could contain specific patients and their medical results over a period of years. Each patient may have varying times and number of visits. In general a patient will only have a single gender, birthday, or ethnicity, which is consistent throughout his/her life. Longitudinal data are those values which exist an unknown number of times per patient. A patient may receive only a single diagnosis, or may be diagnosed with multiple different diseases. Some patients may not have any values for some longitudinal quasi-identifiers (QIs). An L2 group refers generically to a set of values drawn from one or more longitudinal tables which can be relationally linked together. A dataset may have more than one L2 group which cannot be inter-connected.

Such datasets are valuable in research and analytics, however the use of the datasets can provide an opportunity for attackers to determine personally identifiable information resulting in a data breach. In medical databases a patient can have multiple events based upon for example diagnoses, procedures, or medical visits defining L2 data.

Traditionally, if a risk of re-identification for a dataset is estimated to be too high (compared to a settable threshold), the estimated risk is reduced by use of one or more of several techniques to perturb the data, such as suppressing the search results entirely, intentional suppression of specific matching returned records, inclusion of patient data from a wider selection criteria (e.g., a wider age band), intentionally returning patient records that do not meet all of the selection criteria, shifting dates of events and so forth. However, these techniques necessarily degrade the returned data, with resulting effects on any findings based upon the degraded returned data.

Shifting considers events that are closely related temporally as forming a single group, and applies a shift of X days either backward or forward to the entire group. Date shifting processes of the background art did not enforce bounded time intervals for the shifted dates. Methods of the background introduced greater variability between dates as the overall number of dates processed increased. For example, suppose a patient record includes a first event on Jan. 1, 2015, then 20 intermediate hospital visits, and a final event on Mar. 30, 2016. Under methods of the background art, the end dates (e.g., Jan. 1, 2015 and Mar. 30, 2016) may expand outward by a relatively large amount as the 20 intermediate events are shifted.

Jittering, on the other hand, individually considers a date $D_i$ for a respective event "i" (or for a group of events if members of the group are closely spaced in time), and applies a shift of $X_i$ days backward or forward to each $D_i$, within predetermined parameterized boundaries and while avoiding reordering of dates.

Embodiments adjust dates and lower a risk of re-identification by introducing a controlled and limited amount of date or time jitter, such that relative time sequences of the events are preserved, in order to protect against interval attacks. Time boundaries at the beginning or end of a data set are not expanded significantly. Embodiments make sure that the beginning or end dates expand outward at most by a relatively small amount, e.g., by less than +/−3 days as controlled by user configuration. This feature may be referred to as constrained bounds. For example, this feature prevents a time range of 365 days before jittering to grow to, e.g., 400 days, 500 days, or 1,000 days after jittering. In this way, embodiments help ensure data quality for any given interval by preserving consistent cumulative intervals.

Some methods of the background art use random shifting with bounded randomization of intervals, making the results not necessarily repeatable or reversible. Other methods of the background art include adding random date jitter amounts in an unbounded way, which leads to "date drift".

In contrast, embodiments protect date intervals by using a deterministic amount of jitter. The deterministic jitter may be calculated by use of a hash function. The deterministic jitter has advantages of repeatability and consistency, i.e., for a same set of dates, same project key, and same patient key, embodiments produce the same output of shifted and/or jittered dates when de-identifying the same data. This allows embodiments to process incrementally for additional events in time, with minimal additional effort. Thus, embodiments are suitable for streaming, and incrementally updating a patient's profile. "Streaming" as used herein refers to a near-real time process operating continuously or at discrete time intervals (e.g., hourly or daily) that are frequent compared to how often any one patient's data is expected to change. Streaming at discrete time intervals may also be referred to as "batching". Newly received streaming data may be added either to the second boundary group (defined with respect to FIGS. 3A-3B) if close enough in time to existing members of the second boundary group, or may form a new second boundary group (in which case the former secondary boundary group will become a non-boundary group).

For example, suppose before application of jitter, two groups of events are ten days apart. Embodiments would then apply a jitter of plus or minus a few days, the applied jitter being less that the group separation of ten days, so that an attacker would be unable to re-identify a person based on the intervals. The amount of jitter to apply may depend on the nature of the analysis to be done (e.g., a time-sensitive analysis may apply relatively less jitter than an analysis that is not sensitive to time).

Embodiments also include a feature of preserving incremental ordering, i.e., the relative order of events in different groups and within groups will not change. Preserving incremental ordering ensures that, given a first event that in reality happened before a second event, does occur after the second event according to jittered dates.

Embodiments of a jitter process described herein are particularly suitable for dates, because intervals between dates can yield QI information unless the intervals are perturbed. In contrast, different techniques are more suitable for other types of patient information. For example, a generalization technique may be more useful for patient age information. A clustering process may be more useful for height, weight, or zip code data, and so forth. Generally, to maximize data quality, perturbation processes select an appropriate process by considering what the data represents, and then using a process that best supports the analytic studies, while protecting the patient's identity. Data is perturbed enough that attackers cannot figure out who the data corresponds to, yet remaining useful for analytic study. Suppression and masking are also useful tools for de-identification. Each tool is for different purposes.

Embodiments in accordance with the present disclosure provide smart suppression using improved date jittering. Improved date jittering helps avoid unnecessary degradation of patient data used for medical studies, and helps avoid release of data that is susceptible to re-identification. Patient privacy is enhanced, and medical studies have access to better quality data.

FIG. 1 illustrates exemplary populations 110, 106, 104 and a sample 102. The sample 102 in this case contains one person, the target. Sample 102 represents nine people 104 in the represented population 104, i.e. the target looks like eight other people in the represented population 104.

The sample 102 contains a randomly selected person from the prevalent population 106. This is the group of people who could be in the dataset. i.e., if the dataset is about cancer, then the prevalent population 106 is all people who have cancer. In this example the prevalence is ⅕, or 18 people have breast cancer and could be in the dataset. This group of 18 people will be called the prevalent population 106 to indicate the relationship to disease and that population size*prevalence=prevalent population size.

The sample 102 is a subset of the prevalent population 106, one patient in this case, and the one patient looks similar only to half of prevalent population 106. Thus, k=1, K=9, and N=18, where N is the prevalent population size.

The population 110 contains everyone, even people who do not have cancer. The sampling fraction is defined as the ratio between the sample 102 and the prevalent population 106. The represented fraction is defined as the ratio between the sample 102 and the represented population 104. From this point on, the prevalent population 106 will be referred to as the population.

In embodiments, Quasi-Identifiers (QIs) are sub-divided into categories based on the largest (i.e., most general) group of people who can know a piece of information, either public information or acquaintance information.

Public—This data is either publically available or the recipient has this data. Public data should be structured, accessible to the recipient, and cover a large portion of the population, such as 1% or greater. A good test for public knowledge is "could the recipient look up this value for a large percentage of randomly selected people." While self-disclosure and newspapers are public knowledge, they are not structured and do not cover a large part of the population.

Acquaintance—A person can know this information if they are familiar with the person or if they see them. Acquaintance level knowledge also includes public information on celebrities and public figures that have their personal lives disclosed.

Acquaintance knowledge is not required to be structured or centralized, however it should be knowable by many acquaintances. A good test is "Would at least 50% of your acquaintances know this information?"

Figure 2:
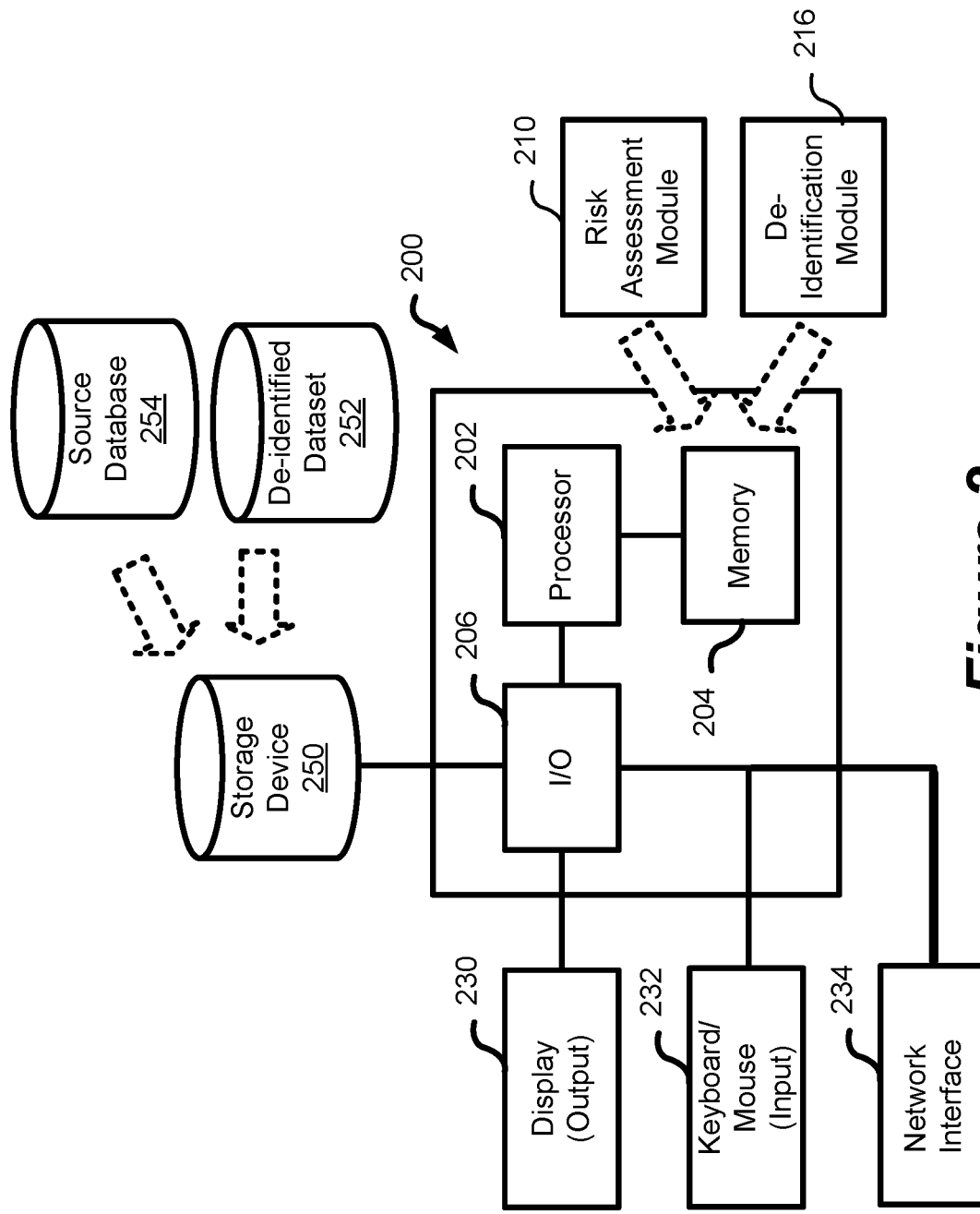
FIG. 2 shows a representation of system for determining re-identification risk of dataset in accordance with an embodiment of the present disclosure.

FIG. 2 shows a system 200 for performing risk assessment and perturbation of a dataset, in accordance with an embodiment of the present disclosure. System 200 executes on a computer including a processor 202, memory 204, and input/output interface 206. Memory 204 executes instruction for providing a risk assessment module 210, which performs an assessment of re-identification risk. The risk assessment may also include a de-identification module 216 for performing further de-identification of the database or dataset based upon the assessed risk. A storage device 250, either connected directly to the system 200 or accessed through a network (not shown) stores the de-identified dataset 252 and possibly the source database 254 (from which the dataset is derived) if de-identification is being performed by the system. A display device 230 allows the user to access data and execute the risk assessment process. Input devices such as keyboard and/or mouse provide user input to the I/O module 206. The user input enables selection of desired parameters utilized in performing risk assessment, but may also be selected remotely through a web-based interface via network interface 234. The instructions for performing the risk assessment may be provided on a computer readable memory. The computer readable memory may be external or internal to the system 200 and provided by any type of memory such as read-only memory (ROM) or random access memory (RAM). The risk assessment process can determine a risk for population to sample and sample to population type attacks in order to aid in determining quasi-identifier de-identification or anonymization strategies to be applied to the dataset.

Each element in the embodiments of the present disclosure may be implemented as hardware, software/program, or any combination thereof. Software codes, either in its entirety or a part thereof, may be stored in a computer readable medium or memory (e.g., as a ROM, for example a non-volatile memory such as flash memory, CD ROM, DVD ROM, Blu-ray™, a semiconductor ROM, USB, or a magnetic recording medium, for example a hard disk). The program may be in the form of source code, object code, a code intermediate source and object code such as partially compiled form, or in any other form.

It would be appreciated by one of ordinary skill in the art that the system and components shown in FIG. 2 may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as defined in the claims.

Figure 3A:
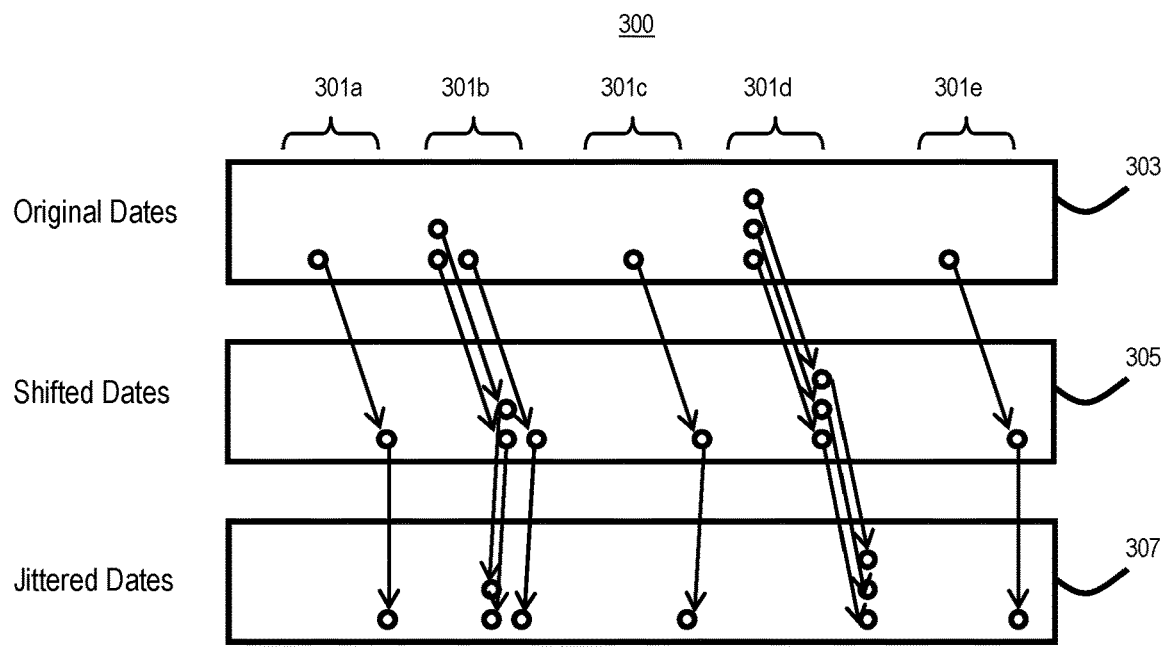
FIG. 3A shows a data set at intermediate processing points in accordance with an embodiment of the present disclosure.

FIG. 3A illustrates, at a higher of abstraction, a sequence 300 of intermediate processing states of a data set at three points of a date jittering process in accordance with an embodiment of the present disclosure. Each of the three states is represented by a respective panel 303, 305, 307. Within each of panels 303, 305, 307, the horizontal X-axis represents time, and the vertical Y-axis represents an ordinal count.

Panel 303 represents original dates of events for one or more patients. The data is illustrated as being segmented into five groups. The five groups represent patient data selected because the patients and/or the events satisfy predetermined traits or other selection criteria. The events for each of the five groups is represented by groups 301a . . . 301e, respectively.

Panel 305 represents the result of a simple time shift, i.e., time shifting all events of panel 303 by a fixed amount of time. This represents a simple shift. All events illustrated in panel 305 maintain the same time spacing between events, compared to the time spacing between corresponding events in panel 303. The time shift of panel 305 protects against an attacker who knows exact dates pertinent to a predetermined patient.

Panel 307 represents exemplary results of applying a time jitter to events on a group-by-group basis in accordance with an embodiment of the present disclosure. The applied time jitter may be positive, negative, or zero. The time shift of panel 307 protects against an attacker who knows exact intervals between dates pertinent to a predetermined patient. For example, group 301a and group 301e have had zero time jitter applied. Groups 301b and 301c have had a negative time jitter applied, and group 301d has had a positive time jitter applied. Jitter is applied such that the relative order of events does not change in going from panel 303 to panel 307. Furthermore, since jitter may be applied equally to all members of a group, the event-to-event time spacing of members within a group may be invariant.

In some embodiments, the time jitter illustrated in panel 307 may be performed before the time shift of panel 305.

Figure 3B:
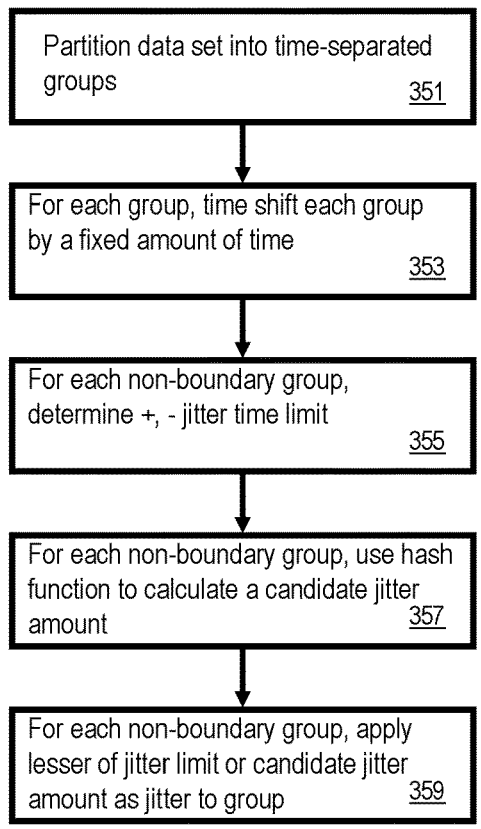
FIG. 3B shows a process flow diagram in accordance with an embodiment of the present disclosure.

FIG. 3B illustrates a process 350 in accordance with an embodiment of the present disclosure. Process 350 corresponds to sequence 300 of intermediate processing states. Process 350 begins at step 351, at which the data is partitioned into time-separated groups. Next, process 350 progresses to step 353, at which each group is time shifted by a fixed amount. Next, process 350 progresses to step 355, at which for each non-boundary group a positive and negative (i.e., forward and backward, respectively) jitter limit is determined. Next, process 350 progresses to step 357, at which for each non-boundary group a hash function is used to calculate a candidate jitter amount. Next, process 350 progresses to step 359, at which for each non-boundary group an amount of jitter is applied that is the lesser of the candidate jitter amount or the jitter limit. When calculating "lesser", a positive candidate jitter is compared to the positive jitter limit. For a negative candidate jitter, the absolute value of the candidate jitter is compared to the absolute value of the negative jitter limit.

FIG. 4A illustrates, at a lower level of abstraction, a sequence 400 of intermediate processing states of a data set at six points of a date jittering process in accordance with an embodiment of the present disclosure. Each of the six states is represented by a respective panel 401-409. Within each of panels 401-409, the horizontal X-axis represents time, and the vertical Y-axis represents an ordinal count.

In overview of sequence 400, jitter bounds are predefined, and may be based at least in part upon user input. For example, jitter bounds for dates may undergo a simple shift of up to one month; so jitter bounds may be up to 15 days. The entire sequence may have been shifted by 15 days forwards, or backwards, providing an ambiguity of each data of about a month.

Embodiments recognize that if an exact interval between two dates is precise and invariant after perturbing the date, then a sequence has been shifted but the intervals have not been shifted. Embodiments apply jitter to the dates, such that the dates may be jittered by a small amount of time, e.g., +/− three days. The small jitter limit may be user-configurable to different limits (e.g., +/−7 days) depending on factors such as the number of dates, density of dates, importance of the data, how the data will be used, and so forth. Embodiments also may consider other conditions, e.g., dates that are within three days of each other may be grouped together, or events within two days of each other may be grouped together.

Sequence 400 begins with panel 401, at which events that are close in time (e.g., within about one day of another group member) are grouped together. It is sufficient that each event is within one day of at least one other event. For example, ten separate events spanning ten days (one event per day) may be considered a single group. Groups may have a minimum of one member. Groups are illustrated in FIG. 4A by dotted boxes. Exemplary groups 421a-421e are marked in panel 401, but for sake of clarity not all groups in FIG. 4A are marked with a reference number. Preferably, groups should be separated by a time gap of more than one day. In some embodiments, a time gap between groups will be larger than at least some of the time separations between events within the two groups on either side of the time gap. Events within groups may be shifted together to increase their associated analytic value. Shifting events this way increases their analytic value because it is assumed that for closely related dates, the analytic value associated with the interval is high. For instance, if a patient is admitted to a hospital one day and is discharged from the hospital the next day, the meaning of the hospital stay is significantly different from a patient who is admitted to a hospital one day and is discharged from the hospital three days later. For this reason, embodiments group together closely related dates in order to maintain their intervals.

Groups may be either boundary groups or non-boundary groups. Boundary groups are groups at the ends of an entire set of events being analyzed. With respect to the entire set of events illustrated in panel 401, the first group in time (i.e., group 421a) is one boundary group, the last group in time (i.e., group 421e) is a second boundary group. Non-boundary groups are all other groups that are not a boundary group.

In order to assure and to preserve incremental ordering of events, embodiments do not jitter boundary groups since a time gap before a first boundary group or a time gap after a last boundary group cannot be known. Thus, for each non-boundary group, embodiments perform the processing described below with respect to panels 403-407B, as indicated by dotted box 411.

At panel 403, time gaps are determined and recorded between each boundary group and the groups adjacent to it. Each non-boundary group is considered in order, e.g., an ascending time order. For example, for non-boundary group 421b, a first time gap 431 is determined between the present group 421b and the previous group 421a, and a second time gap 433 between the present group 421b and the next group 421c. For sake of clarity, not all time gaps are marked in panel 403 with a reference number.

Time gap 431 may be referred to as a maximum backward jitter shift, and time gap 433 may be referred to as a maximum forward date jitter for group 421b. Time gaps 431, 433 represent an amount of time that group 421b may be jittered, as indicated by the range illustrated between panel 405 and panel 407a. Embodiments may further limit a range of jittering by comparing the first and second time gaps to respective predetermined forward and backward jitter shift parameters. The forward and backward jitter shift parameters represent a maximum amount of jitter, and limiting jitter increases the analytic value of jittered dates, at the expense of a higher risk of re-identification. The value of the forward and backward jitter shift parameters is predetermined based upon an analytic tradeoff, for a specific project, between analytic value and risk of re-identification. Therefore, the value of the forward and backward jitter shift parameters is a function of a desired analytic value and risk of re-identification, and conversely the analytic value and risk of re-identification is a function of the value of the forward and backward jitter shift parameters.

Embodiments then may take the minimum of each value (i.e., by calculating MIN (first time gap, backward jitter shift parameter) and MIN (second time gap, forward jitter shift parameter)), and cap any jitter applied to the group by the minimum of each value. This is equivalent to calculating a jitter amount for the group by first calculating an initial jitter amount, then capping the initial jitter by both the numeric value of the first and second time gaps and by the respective predetermined forward and backward jitter shift parameters.

The amount of jitter may be calculated by use of a deterministic function such as a hash function. For example, embodiments in accordance with the present disclosure may take a secret key (e.g., a cryptographic key) and a respective date value within each group (e.g., the first date) as inputs to a combination hash and encryption function. In contrast, some techniques of the background art use a random number generator to determine an amount of jitter. Usage of a deterministic function such as a hash facilitates embodiments having predictable and reproducible amounts of jitter and shift. Hashing allows embodiments to support predictable data updates. This allows simple shifting to be consistent even in a streaming scenario.

The secret key may include one or more sub-keys, such as a project sub-key that is specific to the project, and/or an entity sub-key that is specific to the entity (e.g., a patient) whose data is being processed. The project sub-key is a cryptographic key assigned to a project at the inception of the project, and remains associated with the project throughout the duration of the project. For example, the project sub-key may be a 128-bit randomly-generated universally unique identifier (UUID) by default, but a user may override the default project sub-key with substantially any arbitrary string. The entity sub-key depends on the data and may be a medical record number, a numeric identifier, or substantially any arbitrary string.

The hash function takes in the secret key (i.e., project and patient sub-keys) as well as the first date in the group to be jittered, and returns a long integer value, e.g., in range $[-2^{63}, 2^{63}-1]$. To ensure that embodiments return a value within an acceptable range, embodiments map the returned hash value to a value within the prescribed range (i.e., [−jitter, +jitter]) using modulo arithmetic. For example, if embodiments use a jitter parameter of three days, but there was room to shift forward by only two days without colliding with another group, then the jitter range would be [−3, 2], which has a size of six days. To ensure that a hash value "H" falls within this jitter range, embodiments calculate the value of H modulo the jitter range (i.e., H mod 6) to give a value in the modulo range [0, 5]. The modulo range is then shifted to coincide with the jitter range (e.g., in this example by adding the starting value "−3" of the jitter range) to produce a value within the range [−3, 2].

In some embodiments, unequal amounts of jitter may be applied at different times for the same patient, depending upon the nature of the data. This may be illustrated as, e.g., a first set of limits for a first non-boundary group and a second set of limits for a second non-boundary group, such that the first set of limits is different than the second set of limits. For example, during a study of pregnancy, events during the first trimester may be jittered less than events during the third trimester, if the study is about events that are most impactful early in a pregnancy.

Next, panel 407b illustrates a computed amount of date jitter being applied to events within group 421b. Once a respective calculated date jitter is calculated and applied to each non-boundary group of FIG. 4A, the resulting date-jittered data set is outputted, as illustrated in panel 409.

Figure 4B:
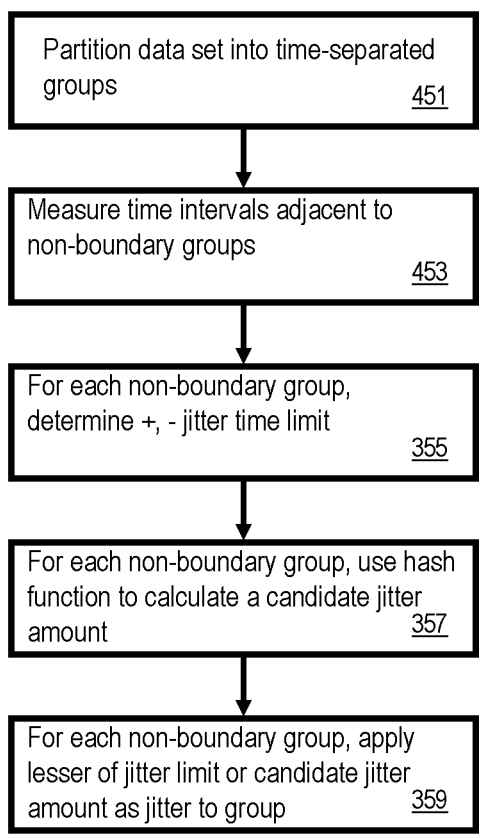
FIG. 4B shows a process flow diagram in accordance with an embodiment of the present disclosure.

FIG. 4B illustrates a process 450 in accordance with an embodiment of the present disclosure. Process 450 corresponds to sequence 400 of intermediate processing states. Process 450 begins at step 451, at which the data is partitioned into time-separated groups. Next, process 450 progresses to step 453, at which time intervals are measured between each non-boundary group and the groups next to it. Next, process 450 progresses to step 455, at which for each non-boundary group a positive and negative (i.e., forward and backward, respectively) jitter limit is determined. Next, process 450 progresses to step 457, at which for each non-boundary group a hash function is used to calculate a candidate jitter amount. Next, process 450 progresses to step 459, at which for each non-boundary group an amount of jitter is applied that is the lesser of the candidate jitter amount or the jitter limit. When calculating "lesser", a positive candidate jitter is compared to the positive jitter limit. For a negative candidate jitter, the absolute value of the candidate jitter is compared to the absolute value of the negative jitter limit.

Embodiments in accordance with the present disclosure are applicable to sensitive or confidential information other than medical data. For example, embodiments may be applied to salary data, surveillance records, and so forth.

Embodiments of the present disclosure include a system having one or more processing units coupled to one or more memories. The one or more memories may be configured to store software that, when executed by the one or more processing unit, allows practice of the embodiments described herein, at least by use of processes described herein, including at least in FIGS. 3A-4B, and related text.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present disclosure may be dependent on various considerations, such as the speed or efficiency requirements of the system, the particular function, and the particular software or hardware systems being utilized.

While the foregoing is directed to embodiments of the present disclosure, other and further embodiments of the present disclosure may be devised without departing from the basic scope thereof. It is understood that various embodiments described herein may be utilized in combination with any other embodiment described, without departing from the scope contained herein. Further, the foregoing description is not intended to be exhaustive or to limit the disclosure to the precise form disclosed. Modifications and variations are possible in light of the above teachings or may be acquired from practice of the disclosure. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context.

No element, act, or instruction used in the description of the present application should be construed as critical or essential to the disclosure unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. § 112(f), and any claim without the word "means" is not so intended.

The invention claimed is:

1. A computer-implemented method to anonymize digitally stored patient records, the method comprising:
   receiving a plurality of patient records from one or more databases;
   assigning each of the received plurality of patient records into one of a first group associated with a first time period, a second group associated with a second time period, or a third group associated with a third time period, wherein the third time period falls between the first and second time periods;
   determining for each of the patient records in the third group a time shift, such that a respective time shifted patient record of the third group is outside the time periods associated with the first group and the second group;
   generating a maximum time shift based on the determined time shifts for the patient records of the third group; and for each of the patient records assigned to the third group, temporally shifting the patient record by an amount less than the maximum time shift to anonymize the patient records in the third group.

2. The method of claim 1, further comprising:
identifying a forward shifting limit and a backward shifting limit for the first, second, or third group.

3. The method of claim 1, further comprising:
determining a forward time shifting level for the first, second, and third group positioned between a first boundary and second boundary.

4. The method of claim 1, further comprising:
shifting the plurality of patient records in one or more of the first, second, or third group by a fixed amount of time.

5. The method of claim 1, further comprising:
adjusting at least one of the first or second group according to the time shifting levels to provide protection to patients represented by the plurality of patient records.

6. The method of claim 1, further comprising:
identifying at least one of the first, second, or third group to not apply any of the time shifting levels among the groups between a first boundary and a second boundary.

7. The method of claim 1, further comprising:
selecting data for the plurality of patient records for the first, second, and third group that satisfy a predetermined selection criteria.

8. A computer program product comprising a tangible storage medium encoded with processor-readable instructions that, when executed by one or more processors, enable the computer program product to:
receive a plurality of patient records from one or more databases;
assign each of the received plurality of patient records into one of a first group associated with a first time period, a second group associated with a second time period, or a third group associated with a third time period, wherein the third time period falls between the first and second time periods;
determine for each of the patient records in the third group a time shift, such that a respective time shifted patient record of the third group is outside the time periods associated with the first group and the second group;
generate a maximum time shift based on the determined time shifts for the patient records of the third group; and
for each of the patient records assigned to the third group, temporally shift the patient record by an amount less than the maximum time shift to anonymize the patient records in the third group.

9. The computer program product of claim 8, wherein a forward shifting limit and a backward shifting limit for the first, second, or third group are identified.

10. The computer program product of claim 8, wherein a forward time shifting level for the first, second, and third group positioned between a first boundary and second boundary is determined.

11. The computer program product of claim 8, wherein the plurality of patient records in one or more of the first, second, or third group are shifted by a fixed amount of time.

12. The computer program product of claim 8, wherein at least one of the first or second time group are adjusted according to the time shifting levels to provide protection to patients represented by the plurality of patient records.

13. The computer program product of method of claim 8, wherein at least one of the first, second, or third group is identified to not apply any of the time shifting levels among the groups between a first boundary and a second boundary.

14. The computer program product of claim 8, wherein data for the plurality of patient records for the first, second, and third group that satisfy a predetermined selection criteria is selected.

15. A computer system connected to a network, the system comprising:
a memory configured to store instructions; and
one or more processors configured to execute the instructions to:
receive a plurality of patient records from one or more databases;
assign each of the received plurality of patient records into one of a first group associated with a first time period, a second group associated with a second time period, or a third group associated with a third time period, wherein the third time period falls between the first and second time periods;
determine for each of the patient records in the third group a time shift, such that a respective time shifted patient record of the third group is outside the time periods associated with the first group and the second group;
generate a maximum time shift based on the determined time shifts for the patient records of the third group; and
for each of the patient records assigned to the third group, temporally shift the patient record by an amount less than the maximum time shift to anonymize the patient records in the third group.

16. The system of claim 15, wherein a forward shifting limit and a backward shifting limit for the first, second, or third group are identified.

17. The system of claim 15, wherein a forward time shifting level for the first, second, and third group positioned between a first boundary and second boundary is determined.

18. The system of claim 15, wherein the plurality of patient records in one or more of the first, second, or third group are shifted by a fixed amount of time.

19. The system of claim 15, wherein at least one of the first or second time group are adjusted according to the time shifting levels to provide protection to patients represented by the plurality of patient records.

20. The system of claim 15, wherein at least one of the first, second, or third group is identified to not apply any of the time shifting levels among the groups between a first boundary and a second boundary.

* * * * *